United States Patent Office 3,270,060
Patented August 30, 1966

3,270,060
AMINE OXIDES
Reginald L. Wakeman, Philadelphia, Pa., and Zdzislaw W. Dudzinski, Hasbrouck Heights, N.J., assignors, by mesne assignments, to Millmaster Onyx Corporation, New York, N.Y., a corporation of New York
No Drawing. Filed Apr. 22, 1963, Ser. No. 274,800
8 Claims. (Cl. 260—583)

This invention relates to tertiary amine oxides in which the tertiary amino group is linked to a carbon atom adjacent the terminal carbon atom of an aliphatic hydrocarbon. The invention also relates to a process of preparing such amine oxides.

We have found that tertiary amines in which the nitrogen is directly linked to the second carbon atom of an open-chain aliphatic hydrocarbon can be converted by oxidation to the corresponding amine oxides having the structure:

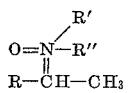

This reaction is surprising because it is known to the art that the attachment of a nitrogen to a secondary carbon atom in an aliphatic chain frequently imposes steric hindrance, preventing many of the customary reactions of the amino group. We have, however, found by suitably oxidizing these tertiary amines in which the amino group is attached to carbon atom number two of a normal aliphatic chain that an amine oxide is formed which possesses excellent surface active properties when the normal aliphatic chain contains from 8 to 20 carbon atoms.

The method of preparation of these tertiary amines is described in our co-pending application Serial No. 274,801 filed on even date herewith. Briefly, this method involves the conversion of straight-chain alpha olefins to the corresponding secondary acid sulfate. This acid sulfate is then neutralized with a secondary amine such, for example, as dimethyl amine and is then reacted under heat and pressure with an excess of the same amine. The amino group thus replaces the sulfate radical on the aliphatic chain, giving tertiary amines having the following general structure:

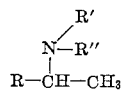

where R may contain from 6 to 32 carbon atoms and R' and R'' may contain from 1 to 34 carbon atoms. In general, we utilize as the initial raw material for the preparation of these amines a straight-chain alpha olefin containing from 8 to 34 carbon atoms, preferably 8 to 20 carbon atoms, and more particularly one containing 10 to 18 carbon atoms which have desirable detergency properties. R will preferably range from $C_6H_{13}$ to $C_{18}H_{37}$. R' and R'' will normally be the same radical having from 1 to 34 carbon atoms each. However, they may, if preferred, be different radicals. We prefer, for most purposes, that R' and R'' should be lower alkyl radicals, more particularly methyl. Thus, the preferred form of the amine structure is:

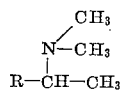

where R contains an aliphatic straight-chain radical having from 8 to 16 carbon atoms. In preparing a tertiary amine of this structure, the alpha olefin is first reacted with sulfuric acid and then converted to the tertiary amine by reaction with a substantial excess of dimethyl amine. We may equally as well use diethyl amine, if preferred, or methyl ethyl amine. We may also use other amines as heretofore indicated containing up to 34 carbon atoms.

In the preparation of the tertiary amine oxides of this invention, the tertiary amines of the generalized formula given above are preferably reacted with hydrogen peroxide, containing about 50% of hydrogen peroxide dissolved in water. Their oxidation is carried out by stirring at slightly elevated temperature until the reaction mixture becomes homogeneous. Although we prefer to use 50% hydrogen peroxide, we are not restricted thereby and may use any other desired concentration of this reagent. Ozone may also be used alternatively, if desired. Moreover, where contamination of other organic materials is not a factor or where the contaminating materials may of themselves be beneficial, it is possible to carry out the preparation of these amine oxides by use of certain organic peroxides such, for example, as tertiary butyl hydroperoxide or cumene hydroperoxide. In some instances, peroxides of aliphatic or aromatic acids such as peracetic or perbenzoic acid may also be employed.

Further details of the invention are given in the following illustrative examples.

Example I 29.6 grams of 2-dimethyl amino dodecane [prepared by reaction of dimethyl amine with the dimethyl amine salt of sulfated dodecene-(1)] were mixed in a glass reaction flask with 10 grams of 50% hydrogen peroxide, 83 grams of isopropanol (99%) and 38 grams of water. The charge was stirred mechanically and heated for six hours at a temperature ranging from 40 to 70° C. The end of the reaction was indicated by clarity of the solution which formed one homogeneous fluid. The product containing 2-dimethyl amino dodecane oxide was found to be 14.5% active.

Example II

A portion of the product from Example I was diluted with distilled water so as to yield a 1% active solution having a pH 8.3. 10 ccs. of glass beads were added to a 100 cc. glass stoppered graduate and 10 ccs. of the 1% solution of the product of Example I were then added, the graduate stoppered and shaken manually by grasping with the hand and rotating the arm through a 90° arc and return, twelve times. The foam height (above the beads) was then recorded as follows:

Immediate height in cc. graduations _____ 86
After standing for 10 minutes _____ 40
After one-half hour _____ 20
After one hour _____ 0

A 3% active solution of the product of Example I was completely miscible with a 5% solution of hydrochloric acid.

Example III

A heavy duty foaming detergent blend was prepared by mixing 35 parts of a 30% active aqueous solution of the sodium salt of a sulfated ehtoxylated lauryl alcohol containing an average of four moles of ethylene oxide with 25 parts of the product of Example I and 40 parts of water. The active detergent content of this blend was 14.25% and it was diluted to a 1% active solution with distilled water. At this point it showed a pH of 9.2, an immediate foam height of 70 ccs. which dropped to 52 ccs. after ten minutes, 35 ccs. after one-half hour and 30 ccs. after one hour. It possesses excellent detergent characteristics and is useful as a general household detergent for dishwashing and the like.

Example IV 35 grams of 2-diethyl amino octadecane were reacted under the conditions of Example I, using 11 grams of 50% hydrogen peroxide. The product was a colorless gelatinous mix at room temperature which possessed useful thickening characteristics when added to cosmetic preparations such as shampoos at a 2% level of activity.

Instead of the 2-diethyl amino octadecane of this example, 0.1 mole of 2-dimethyl amino tetradecane, or 0.1 mole of 2-dimethyl amino tetratriacontane, or 0.1 mole of 2-methylethylamino tetradecane may be used.

It will be apparent from the foregoing disclosure that many specific tertiary open-chain amine oxides can be made having an amino group linked to the carbon atom adjacent the terminal carbon group which could not be readily made previously and have therefore not been available commercially. Such amine oxides are especially useful in detergent lotions, shampoos and heavy duty liquid detergents as described, for example in U.S. Patent No. 2,999,068 and No. 3,001,945. Our amine oxides may be mixed in suitable amounts, for example, from 1 to 20% by weight with available compatible synthetic liquid detergents for various applications as indicated above.

We claim:
1. A tertiary open-chain aliphatic amine oxide having the formula:

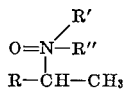

wherein R is an alkyl radical having 6 to 32 carbon atoms, and R' and R" are alkyl radicals each having 1 to 34 carbon atoms.

2. A tertiary open-chain aliphatic amine oxide having the formula:

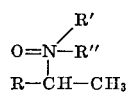

wherein R is an alkyl radical having 10 to 18 carbon atoms, and R' and R" are alkyl radicals each having 1 to 34 carbon atoms.

3. A tertiary open-chain aliphatic amine oxide having the formula:

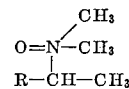

wherein R is an alkyl radical having 6 to 18 carbon atoms.
4. 2-dimethyl amino dodecane oxide.
5. 2-diethyl amino octadecane oxide.
6. 2-dimethyl amino tetradecane oxide.
7. 2-dimethyl amino tetratriacontane oxide.
8. 2-methylethyl amino tetradecane oxide.

References Cited by the Examiner
UNITED STATES PATENTS 2,169,976  8/1939  Guenther et al.
2,758,086  8/1956  Stuart et al. _____ 260—583 X CHARLES B. PARKER, *Primary Examiner.*

JOSEPH P. BRUST, ANTON H. SUTTO, RICHARD L. RAYMOND, *Assistant Examiners.*